US011505095B2

(12) United States Patent
Reif et al.

(10) Patent No.: US 11,505,095 B2
(45) Date of Patent: Nov. 22, 2022

(54) SEAT DEVICE FOR A CONSTRUCTION MACHINE

(71) Applicant: Hamm AG, Tirschenreuth (DE)

(72) Inventors: Gernot Reif, Erlangen (DE); Stefan Reber, Püchersreuth (DE)

(73) Assignee: Hamm AG, Tirschenreuth (DE)

( * ) Notice: Subject to any disclaimer, the term of this patent is extended or adjusted under 35 U.S.C. 154(b) by 52 days.

(21) Appl. No.: 16/950,366

(22) Filed: Nov. 17, 2020

(65) Prior Publication Data

US 2021/0170920 A1    Jun. 10, 2021

(30) Foreign Application Priority Data

Dec. 9, 2019 (DE) ...................... 10 2019 133 569.8

(51) Int. Cl.
*B60N 2/14* (2006.01)
*B60N 2/38* (2006.01)

(52) U.S. Cl.
CPC ................ *B60N 2/14* (2013.01); *B60N 2/38* (2013.01); *B60N 2/143* (2013.01); *B60N 2/146* (2013.01)

(58) Field of Classification Search
CPC .......... B60N 2/14; B60N 2/143; B60N 2/146; B60N 2/38
See application file for complete search history.

(56) References Cited

U.S. PATENT DOCUMENTS

| 3,893,728 A | 7/1975 | Holopainen | |
| 8,763,747 B2 * | 7/2014 | Jones | E02F 9/2004 180/326 |

FOREIGN PATENT DOCUMENTS

| DE | 2151969 A1 | 4/1973 |
| DE | 2245530 A1 | 4/1974 |
| DE | 102004054144 A1 | 5/2006 |
| DE | 10 2005 050 128 A1 | 3/2007 |
| DE | 20 2010 015 414 U1 | 1/2011 |
| EP | 1573134 B1 | 9/2005 |
| EP | 2899318 B1 | 7/2015 |
| EP | 3112207 B1 | 1/2017 |
| JP | H09-109746 A | 4/1997 |
| JP | 2009149220 A | 7/2009 |
| JP | 2009262803 A | 11/2009 |

OTHER PUBLICATIONS

Search Report dated Jul. 23, 2020 in corresponding German Application No. 10 2019 133 569.8; 15 pages including partial machine-generated English-language translation.

(Continued)

*Primary Examiner* — Syed A Islam
(74) *Attorney, Agent, or Firm* — Maier & Maier, PLLC (57) ABSTRACT

A seat device for a construction machine comprising a positioning device and a seat console having a seat arranged thereon, wherein the positioning device comprises a first pivot arm and a second pivot arm for guiding the seat console along a curved trajectory, wherein the pivot arms respectively comprise a first end and a second end, wherein the respective first end of the pivot arms is supported on the positioning device via a respective first rotary joint, and the respective second end of the pivot arms is connected to the seat console via a respective second rotary joint in a manner as spaced apart from each other.

20 Claims, 4 Drawing Sheets

(56) References Cited

OTHER PUBLICATIONS

Extended European Search Report dated May 3, 2021, in connection with corresponding EP Application No. 20208702.9 (16 pp., including machine-generated English translation).
Office Action dated Mar. 24, 2022 in India Patent Application No. 202044048019 (with English translation); 7 pages.

* cited by examiner

SEAT DEVICE FOR A CONSTRUCTION MACHINE

FIELD

The invention relates to a seat device for positioning a seat of a construction machine as well as a construction machine having such a seat device.

BACKGROUND

In particular in the field of earthwork construction machines are frequently used where special demands are made on safety and comfort during operation by a vehicle driver. For example, a soil compactor works the earth by passing several times over the earth for producing the desired final compacting and evenness of the surfaces. In doing so, the direction of travel is frequently changed. As a rule, the amounts of forward and backward travel are approximately the same. Such construction machines in the form of road rollers are known from EP 1 573 134 B1, for example.

A safe and comfortable operation of the construction machine in both directions of travel is thus desirable. For this purpose, on the one hand, the essential operating elements of the construction machine must be easily accessible for the vehicle driver and their functionality must not be affected or they must not be inadvertently actuated. On the other hand, the visibility of the vehicle driver in both directions of travel must be ensured such that the vehicle driver can recognize the situation outside the construction machine in both directions of travel.

From prior art, from DE 20 2010 015 414 U1, EP 2 899 318 B1 and EP 3 112 207 B1, for example, construction machines are known which comprise a seat which is horizontally adjustable and rotatable about a rotation axis of the seat. Further, from EP 1 573 134 B1 a construction machine is known where the operating elements are integrated in a rotary seat, wherein the direction of actuation of the operating elements in every position of the rotary seat coincides with the direction of travel of the construction machine.

An essential disadvantage of the prior-art seat device is that the seat displacement and seat rotation take place in two separate operating steps. As a rule, a vehicle driver must first displace the seat before he can adjust the seat rotation. The possible seat rotation can be limited depending on the seat position. An optimum seat positioning is thus time-consuming and extremely cumbersome. Since during construction work the work steps are frequently to be carried out under time pressure, the positioning possibilities of the seats are often inadequately used at the expense of safety.

Accidents and problems occurring due to an inadequate adjustment of the seat position showed that there is need for action with regard to the safety and comfort during operation of a construction machine. For example, operating elements arranged at the seat may collide with the driver's cab of the vehicle driver during adjustment or rotation of the seat depending on the seat position. Therefore, there is a considerable risk that operating elements are inadvertently operated which may result in serious accidents. Further, the operability of the operating elements can be limited or hindered by the spatial limitation of the driver's cab.

Depending on the direction of travel, the vehicle driver must ensure a good visibility to the outside to be able to reliably operate the construction machine. When traveling backward, the vehicle driver normally assumes a non-ergonomic and uncomfortable sitting posture. Depending on the duration of a backward travel, this may lead to the vehicle driver temporarily assuming a more comfortable posture at the expense of the rearward visibility. Thus there is need of optimizing the positioning of seats in construction machines.

SUMMARY

It is therefore an object of the invention to provide a seat device for positioning seats in construction machine by means of which the operational safety and the operating comfort are enhanced.

The seat device for a construction machine according to the invention comprises a positioning device and a seat console having a seat arranged thereon, wherein the positioning device comprises a first pivot arm and a second pivot arm for guiding the seat console along a curved trajectory, wherein the pivot arms respectively comprise a first end and a second end, wherein the respective first end of the pivot arms is supported on the positioning device via a respective first rotary joint, wherein the first rotary joints of the pivot arms have a distance $A_1$, and the respective second end of the pivot arms is connected, spaced apart from each other, to the positioning device via a respective second rotary joint, wherein the second rotary joints of the pivot arms have a distance $A_2$, wherein the distance of the first rotary joint of the first pivot arm to the second rotary joint of the first pivot arm is the distance $L_{11}$, and the distance of the first rotary joint of the second pivot arm to the second rotary joint of the second pivot arm is the distance $L_{12}$, and wherein the first rotary joints are offset from each other in the direction of travel and/or $L_{11} \neq L_{12}$ and/or $A_2 > A_1$, wherein, during positioning, the seat console is moved, starting from a basic position, along the curved trajectory and, in doing so, is rotated inward toward the longitudinal center plane of the positioning device due to the curved trajectory. Preferably, the longitudinal center plane of the positioning device corresponds to the longitudinal center plane of the construction machine.

Here, the basic position is the position in which the seat console is arranged during a normal straight-ahead travel such that the seat console is oriented in the direction of travel. Preferably, in the basic position the seat direction corresponds to the direction of travel. The seat can comprise at least one arm rest and/or at least one operating panel which is/are moved together with the seat.

Due to the arrangement according to the invention, a trajectory is defined along which the seat console together with a seat located thereon can be positioned. Outside the defined trajectory the seat cannot be positioned. Positioning of the seat along the trajectory includes a simultaneous displacement and rotation of the seat console. That is, the seat console is displaced relative to the driver's cab and simultaneously rotated, wherein the displacement and rotation of the seat console take place in the same plane.

By providing different distances $L_{11}$ and $L_{12}$ and/or $A_2 > A_1$ and/or arranging the first rotary joints of the pivot arms in an offset manner in the direction of travel, the trajectory is curved such that during positioning the seat console is moved, starting from a basic position in which the seat console is oriented in the direction of travel, from the longitudinal center plane of the positioning device outward and forward in the direction of travel and, in doing so, simultaneously rotated inward toward the longitudinal center plane of the positioning device. In other words, during positioning, as seen from the view of a vehicle driver, the seat console is displaced, starting from the basic position, in a forward left direction and a forward right direction, respectively, and simultaneously rotated to the right and the left, respectively. Such a trajectory allows a vehicle driver to assume a particularly comfortable seating position with regard to the visibility field and comfort.

The seat device according to the invention further allows for the positioning of the seat arranged on the seat console to be carried out in a single work step. Positioning of the seat console and the seat arranged thereon along the predefined curved trajectory is carried out in a collision-free manner. In particular, the predefined trajectory can advantageously avoid a collision of operating elements arranged at the seat with the driver's cab of the vehicle driver. The operating safety of the vehicle is thus considerably increased in comparison to conventional seat devices. Further, the seat adjustment can be carried out in a time-saving manner since the displacement and rotation of the seat position are not performed in two separate steps but in a single step. Further, in the seat device according to the invention the operating comfort is advantageously enhanced. Due to the simple adjustment of the position of the seat, a vehicle driver can efficiently adjust the seat and assume an ergonomic posture even for short backward travels, for example. The physical stress of a vehicle driver is thus advantageously reduced.

It is particularly preferred that the seat device according to the invention functions exclusively in a mechanical manner. Exclusively mechanical solutions are more robust and inexpensive in comparison to electrical solutions. However, a motorized embodiment is principally also feasible.

Preferably, the curved trajectory along which the seat console can be positioned lies in a plane orthogonal to the longitudinal center plane of the positioning device which preferably corresponds to the longitudinal center plane of the construction machine. In other words, positioning of the seat console is essentially carried out in parallel to a ground on which the construction machine is located.

For enhancing the safety, in particular for ensuring an improved visibility of the vehicle driver during backward travels, it suffices to position the seat in a single plane essentially extending in parallel to the ground on which the construction machine is located. Thus, it is possible to keep the complexity of the configuration of the positioning device small. In addition, the positioning device can therefore be adapted in a simple manner to different construction machines and is thus versatile. This can be realized by using rotary joints having rotation axis which are parallel to each other, for example.

Preferably, it is provided that the first and the second pivot arm do not intersect each other when the seat console is positioned along the entire course of the curved trajectory.

It can further be provided that the second rotary joints are spaced apart at the same distance from the front edge of the seat console, as seen in the seat direction. In other words, a connecting line of the second rotary joints of the pivot arms extends in parallel to the front edge of the seat console. Here, the front edge of the seat console extends orthogonally to the longitudinal center plane of the construction machine when the seat console is in a basic position in which the seat direction corresponds to the direction of travel.

Preferably, the second rotary joints have a distance $A_2$, wherein the following applies: $L_{11}>A_2>0.1\ L_{11}$ and/or $L_{12}>A_2>0.1\ L_{12}$, preferably $L_{11}>A_2>0.3\ L_{11}$ and/or $L_{12}>A_2>0.3\ L_{12}$, particularly preferably $L_1>A_2>0.5\ L_{11}$ and/or $L_{12}>A_2>0.5\ L_{12}$.

The distance $A_2$ determines the ratio between the degree of rotation and the displacement of the seat console. A suitable selection of the distance $A_2$ thus allow for defining to what degree the seat console is rotated when the seat console is moved along the curved trajectory. The distance $A_2$ as per the stated criteria has thus turned out to be particularly advantageous.

Particularly preferably, the second rotary joint of the first pivot arm is always located between a first plane and a second plane when the seat console is moved, wherein the first plane lies in parallel to the longitudinal center plane of the positioning device and extends through the first rotary joint of the first pivot arm, and wherein the second plane lies in parallel to the longitudinal center plane of the positioning device and extends through the first rotary joint of the second pivot arm. Preferably, the second rotary joint of the second pivot arm is located between the first and the second plane when the seat console is moved as well as on the side of the second plane facing away from the first plane. Preferably, the first rotary joints have a distance $A_1$, wherein the following applies: $A_1>0.5\ L_{11}$ and $A_1>0.5\ L_{12}$, preferably $A_1>L_{11}$ and $A_1>L_{12}$.

This arrangement allows for the first pivot arm to push the seat console at the second rotary joint of the first pivot arm away from the positioning device when the seat console is moved from the basic position to the left, as seen in the direction of travel, whereby the seat console is rotated to the right (in a mathematically negative direction). Conversely, when the seat console is moved from the basic position to the right, as seen in the direction of travel, the first pivot arm is allowed to pull the seat console at the second rotary joint of the first pivot arm toward the positioning device, whereby the seat console is rotated to the left (in a mathematically positive direction).

By limiting the pivot trajectory of the first pivot arm, the seat console and the seat arranged thereon can further be prevented in a simple manner from colliding with the wall of the driver's cab during positioning. At the same time, the space in the driver's cab is utilized in an optimum manner for allowing the vehicle driver to assume an advantageous sitting posture with regard to safety and comfort.

Preferably, it is provided that the fastening positions of the first rotary joints at the positioning device can be modified, wherein the first rotary joints can be fastened at different positions. For example, oblong holes can be provided in the positioning device, in which oblong holes the first rotary joints of the pivot arms can be displaced, wherein the first rotary joints can be fastened at different positions inside the oblong holes. Alternatively, the positioning device can comprises a hole pattern having a plurality of holes at different positions where the first rotary joints of the pivot arms can be fastened.

The trajectory of the seat console can be adapted to the spatial conditions in the driver's cab of a construction machine by a suitable modification of the fastening positions of the first rotary joints of the pivot arms. For example, a suitable offset of the first rotary joints can be selected for taking into account the spatial boundaries of the driver's cab. In particular, the trajectory along which the seat console can be positioned can be determined such that the seat can be positioned in a collision-free manner. Thus, the seat device need not be custom-made for each construction machine but is versatile with regard to adjustment. Even in the case of construction machines which are already equipped with a seat device according to the invention, the spatial conditions may change during the operating life. For example, a modernization can involve a modification of the operating elements. A modification of the fastening positions of the first rotary joints of the pivot arms allows the trajectory, along which the seat can be positioned, to be adapted to the new conditions and further ensure collision-free positioning of the seat console. Thus a modifiable support of the first rotary joints of the seat device offers an increased versatility. The simple underlying kinematics further allows for a space-saving and inexpensive design of the seat device.

It can further be provided that the positioning device comprises a limiting means which limits the trajectory of the seat console preferably at both ends.

By providing a limiting device, the limits of the trajectory can be adapted to the spatial conditions of a driver's cab of a construction machine. Thus, collisions during positioning of the seat console can be prevented in a simple manner.

Particularly preferably, the first and/or the second pivot arm come(s) into contact with the limiting means at the respective limits of the trajectory for limiting further movement of the seat console.

Preferably, the limiting means is made up of at least two stops, wherein the trajectory of the seat console is limited by at least one stop in every direction of movement. Preferably, the first and the second pivot arm respectively cooperate with one stop each such that the movement of the seat console in one direction is limited by the first pivot arm abutting against the one stop, and in the other direction by the second pivot arm abutting against the other stop. Alternatively, the trajectory of the seat console can be limited by cooperation of only one of the two pivot arms with both stops.

Preferably, the stops comprise buffer elements made from an elastic material, for example.

The provision of stops offers a simple and inexpensive possibility of limiting the trajectory of the seat console. In particular, limiting of the trajectory can be realized in a simple manner by a cooperation of the stops with the pivot arms. Due to the provision of buffer elements at the stops, abutting of the pivot arms at the limits of the trajectory can take place smoothly and nearly noiselessly. Thereby, the comfort and the safety of the seat device are further enhanced.

Preferably, the seat device comprises a locking device with the aid of which the position of the seat console device can be locked relative to the positioning device. Preferably, the locking device is arranged at the seat console. For example, the position of the seat console can be locked via a form fit between the locking device and the positioning device. Alternatively, locking can also be realized via a friction fit between the locking device and the positioning device.

The provision of a locking device allows a vehicle driver to lock the seat console after positioning of the seat console such that no further undesired movements can be performed. Thereby, the operability and safety of the seat device are enhanced.

Further, it can be provided that the positioning device comprises a base plate having at least one recess, and the locking device comprises a fixing element, wherein the position of the seat console relative to the positioning device can be locked by the fixing element engaging in the at least one recess.

Preferably, the recess is configured as a hole. Preferably, the fixing element is configured as a protruding projection.

Due to such an arrangement, the position of the seat console can be fixed in a particularly simple manner in a desired position. The form-fit engagement of the fixing element in the recess is maintenance-free to a large extent and robust toward contamination.

Particularly preferably, the base plate of the positioning device comprises at least three recesses, wherein a left-hand end position, a right-hand end position and the basic position of the seat console are defined by a respective recess.

The number of recesses preferably configured as holes is adapted to the requirements of the user and the respective construction machine, for example the size of the construction machine to be operated. Thus, more than three recesses can be provided, if required.

Preferably, the seat console, in its right-hand end position, is rotated to the left by at least 15°, as seen from the view of the vehicle driver sitting on the seat and positioned in the direction of travel. Preferably, the seat, console in its left-hand end position, is rotated to the right by at least 70°, as seen from the view of the vehicle driver sitting on the seat and positioned in the direction of travel.

It has turned out that, when the seat is rotated by 70° to the right, the visibility to the right and to the rear is sufficient for offering the vehicle driver a good visibility and ensuring a high safety. Further, it has turned out that, when the seat is rotated by 15° to the left, the visibility to the left is sufficient.

It can further be provided that the locking device comprises an actuating element for locking and unlocking purposes. Preferably, the actuating element is configured as a lever.

With the aid of an actuating element, for example a lever arranged at the side of the seat console, the seat console can be positioned in a simple manner. Locking and unlocking can be performed in a one-handed manner and in particular intuitively. Thus, distraction of the vehicle driver by positioning the seat console is kept small.

It can further be provided that the first and/or the second pivot arm have an angled and/or bent shape.

The angled and/or bent shape of the pivot arms allows the seat device to be configured in a particularly space-saving manner. Further, when the pivot arms are arranged in one plane, a collision of the pivot arms is avoided. Further, when stops for limiting the trajectory are used, is possible to limit in a simple manner the movement of the pivot arms with the aid of stops since a suitable shape of the pivot arms allows the limits of the trajectory, where the pivot arms abut against the stops, to be influenced.

In addition, the invention relates to a construction machine, in particular an earth-moving machine, preferably a single-drum compactor, having a seat device as described above.

BRIEF DESCRIPTION OF THE FIGURES

Hereunder a seat device according to a preferred embodiment of the invention will be described in detail with reference to the following Figures in which.

DETAILED DESCRIPTION

Figure 1:
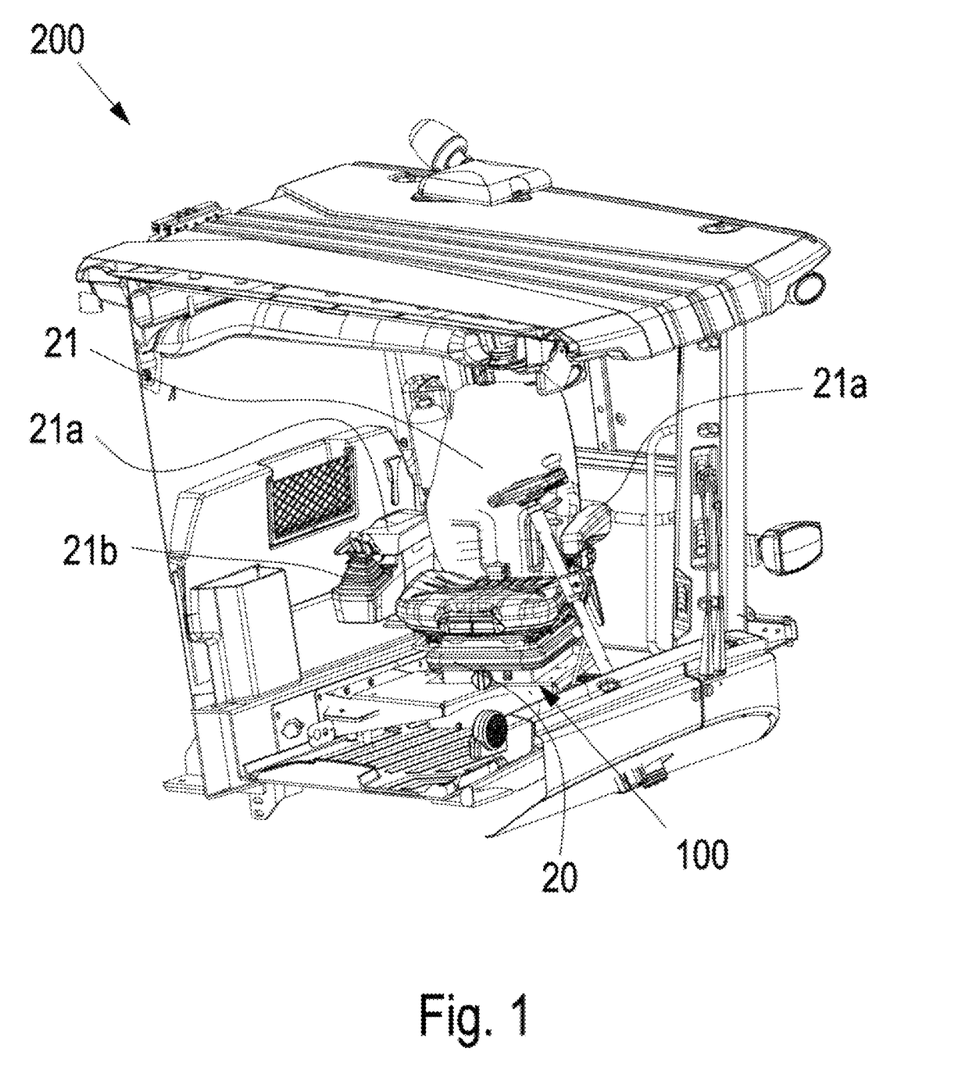
FIG. 1 shows a schematic view of a driver's cab of a construction machine having a seat device according to the preferred embodiment.

In FIG. 1 a driver's cab 200 of a construction machine is illustrated. The construction machine can be a single-drum compactor, for example. In the driver's cab 200 a seat device 100 according to the preferred embodiment of the present invention is located and has a seat console 20 and a seat 21 arranged on the seat console 20 where the vehicle driver can sit. The seat 21 comprises arm rests 21a and operating elements 21b for operating the construction machine.

Figure 2:
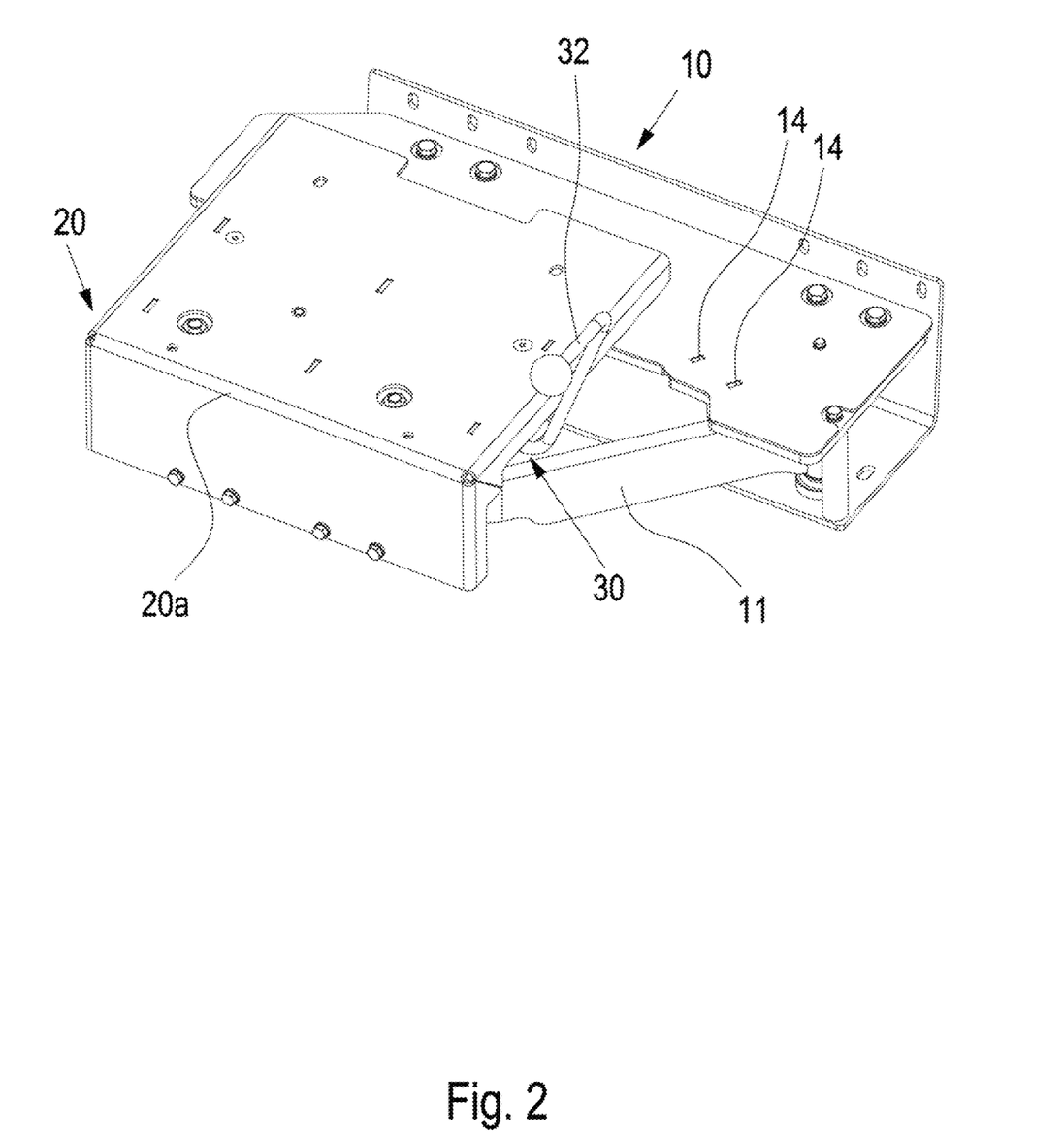
FIG. 2 shows a schematic view of a seat device according to the preferred embodiment.

FIG. 2 show the seat console 20 together with a positioning device 10 which can be arranged in the driver's cab 200 beneath the seat console 20, for example. In the mounted condition of the seat device 100, the positioning device 10 is mounted to the driver's cab 200, wherein a seat 21 is arranged on the seat console 20. The positioning device 10 comprises a first pivot arm 11 and a second pivot arm 12 not illustrated in FIG. 2, at whose ends a respective first rotary joint 1a, 2a and a second rotary joint 1b, 2b, respectively, are arranged. The pivot arms 11, 12 respectively connect the positioning device 10 to the seat console 20 and allow the seat console 20 to be positioned relative to the positioning device 10. This arrangement defines a curved trajectory along which the seat console 20 can be positioned. Outside the trajectory it is not possible to position the seat console 20. In FIG. 2, the seat console 20 is in its basic position, that is the position in which a vehicle driver sitting on the seat 21 would be oriented in the direction of travel. Here, the front edge 20a of the seat console 20 is orthogonal to the direction of travel. At the seat console 20 an actuating element 32 is arranged with the aid of which the position of the seat console 20 relative to the positioning device 20 can be released and fixed, respectively.

Figure 3:
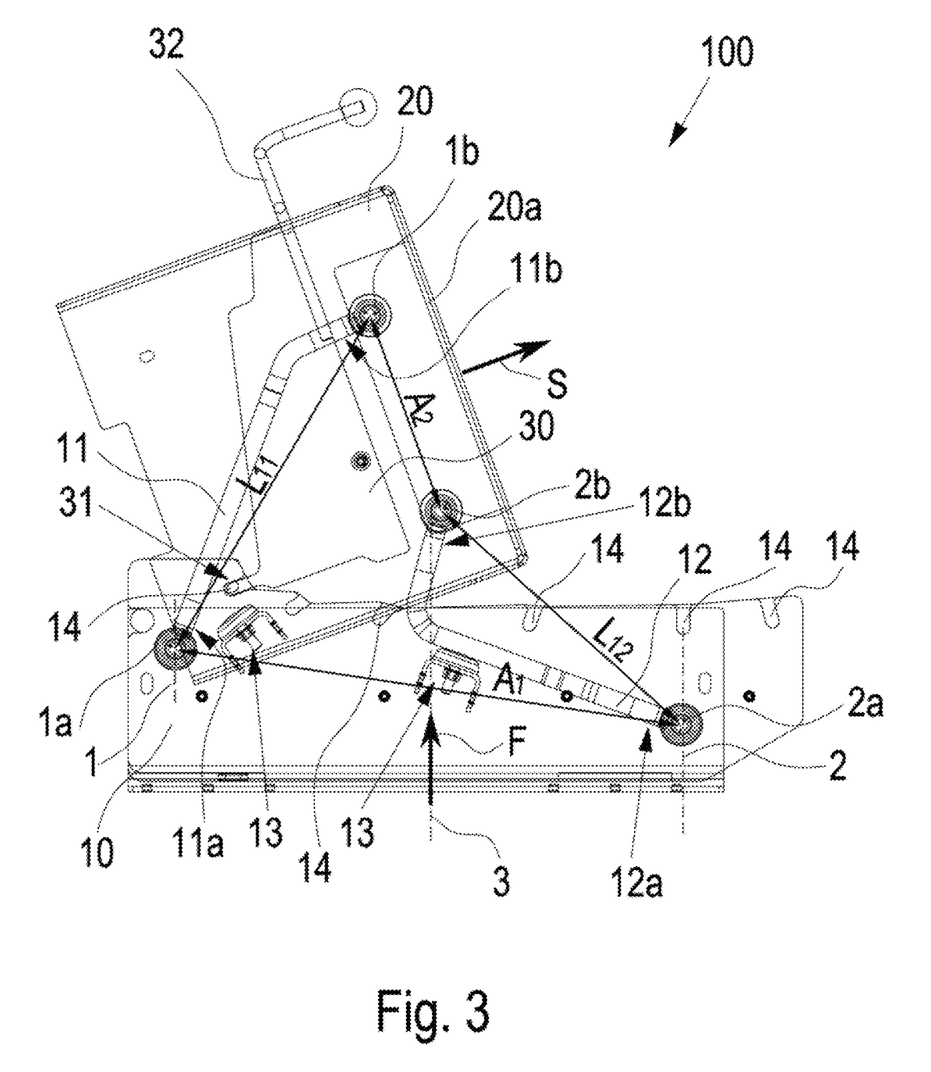
FIG. 3 shows a schematic top view of a seat device in its left-hand end position according to a preferred embodiment.
Figure 4:
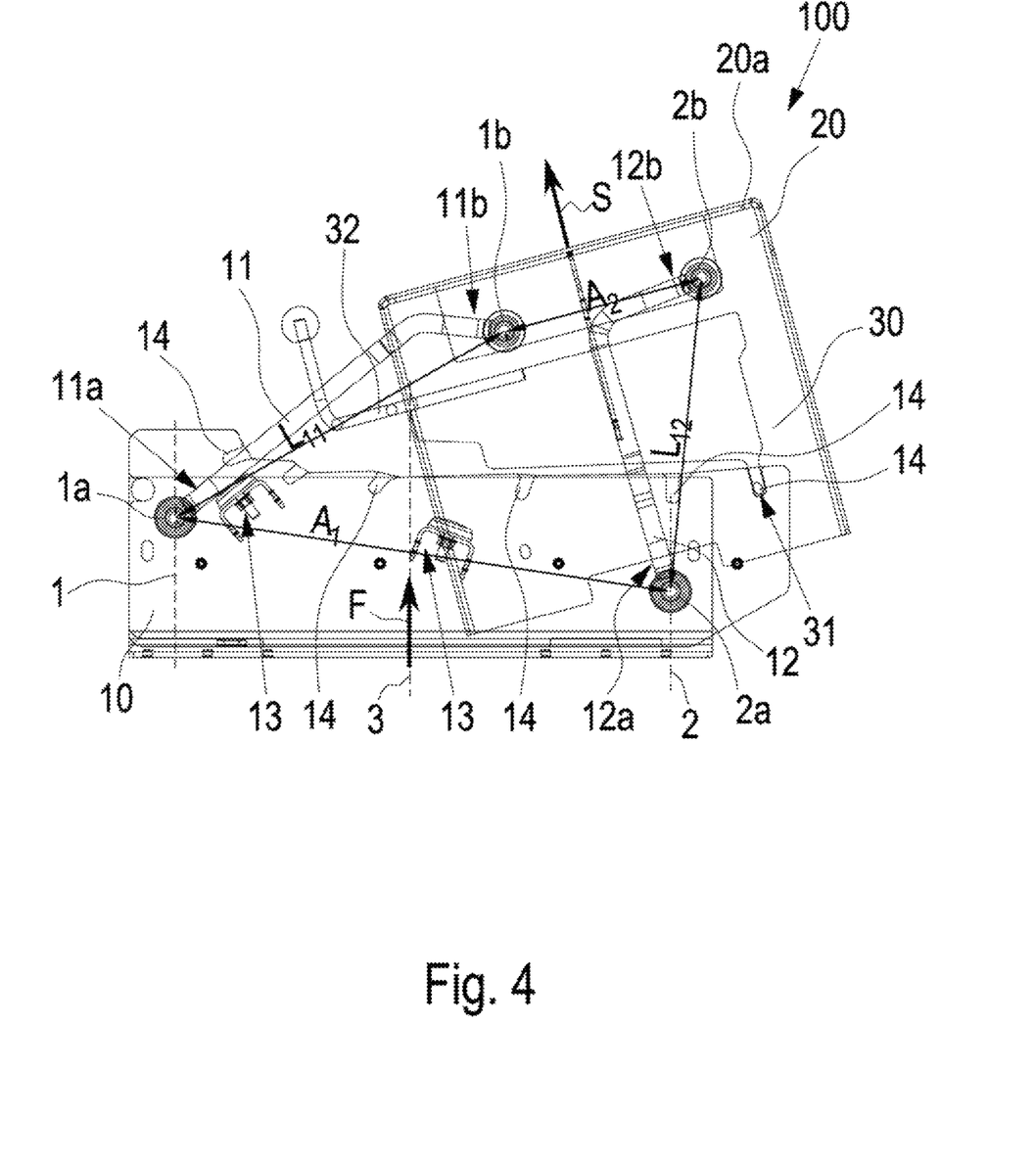
FIG. 4 shows a schematic top view of a seat device in its right-hand end position according to a preferred embodiment.

FIGS. 3 and 4 show in detail the configuration and the functionality of the seat device 100 according to the preferred embodiment of the invention, wherein all covered edges are shown as continuous lines. The first pivot arm 11 comprises a first end 11a and a second end 11b. The first end 11a is stationarily supported at the positioning device 10 via a first rotary joint 1a. The second end 11b is connected to the seat console 20 via a second rotary joint 1b. The distance between the first and the second rotary joint 1a, 1b of the first pivot arm 11 defines the distance $L_{11}$. The second pivot arm 12 comprises a first end 12a and a second end 12b. The first end 12a is stationarily supported at the positioning device 10 via a first rotary joint 2a. The second end 12b is connected to the seat console 20 via a second rotary joint 2b. The distance between the first and the second rotary joint 2a, 2b of the second pivot arm 12 defines the distance $L_{12}$. The first pivot arm 11 and the second pivot arm 12 are arranged in one plane and have an angled configuration for avoiding a collision of the pivot arms 11, 12 during positioning of the seat console 20. Further, the pivot arms 11, 12 do not intersect each other along the entire course of the curved trajectory during positioning of the seat console 20.

The seat console 20 is movable relative to the positioning device 10 and thus also relative to the driver's cab 200 of the construction machine. The positioning movement of the seat console 20 takes place in one plane and includes both displacement of the seat and rotation of the seat. According to the preferred embodiment, the longitudinal center plane 3 of the positioning device 10 corresponds to the longitudinal center plane of the construction machine.

The second rotary joints 1b, 2b of the pivot arms 11, 12 are spaced apart at the same distance from the front edge 20a of the seat console 20, as seen in the direction S of the seat. In other words, the connecting line of the two second rotary joints 1b, 2b of the pivot arms 11, 12 arranged at the seat console 20 extends in parallel to the front edge 20a of the seat console 20. In a basic position of the seat console 20 in which the seat direction S corresponds to the direction of travel F, the front edge 20a of the seat console 20 and the connecting line of the second rotary joints 1b, 2b extend orthogonally to the longitudinal center plane 3 and to the direction of travel.

The second rotary joints 1b, 2b have a distance $A_2$ to each other, wherein the following applies: $L_{11} > A_2 > 0.5\ L_{11}$ and $L_{12} > A_2 > 0.5\ L_{12}$. Further, the first rotary joints 1a, 2a have a distance $A_1$ to each other, wherein the following applies: $A_1 > L_{11}$ and $A_1 > L_{12}$.

According to the preferred embodiment of the seat device 100, the distances $L_{11}$ and $L_{12}$ differ from each other. Further, the first rotary joints 1a, 2a of the pivot arms 11, 12 are arranged offset from each other, as seen in the direction of travel F.

The second rotary joint 1b of the first pivot arm 11 is always located between a first plane 1 and a second plane 2 when the seat console 20 is moved, wherein the first plane 1 is parallel to the longitudinal center plane 3 and extends through the first rotary joint 1a of the first pivot arm 11, and wherein the second plane 2 is parallel to the longitudinal center plane 3 and extends through the first rotary joint 2a of the second pivot arm 12. Further, the second rotary joint 2b of the second pivot arm 12 is located between the first and the second plane 1, 2 when the seat console 20 is moved (cf. FIG. 3) as well as on the side of the second plane 2 facing away from the first plane 1 (cf. FIG. 4).

This arrangement allows for the first pivot arm 11 to push the seat console 20 at the second rotary joint 1b of the first pivot 11 arm away from the positioning device 10 when the seat console 20 is moved from the basic position to the left, as seen in the direction of travel F, whereby the seat console 20 is rotated to the right (in a mathematically negative direction). Conversely, when the seat console 20 is moved from the basic position to the right, as seen in the direction of travel F, the first pivot arm 11 is allowed to pull the seat console 20 at the second rotary joint 11b of the first pivot arm 11 toward the positioning device 10, whereby the seat console 20 is rotated to the left (in a mathematically positive direction).

In other words, this arrangement defines a curved trajectory of the seat console 20 on which the seat console 20 is moved from the longitudinal center plane 3 outward and forward in the direction of travel F when it is positioned starting from the basic position in which the seat console 20 is oriented in the direction of travel F and the seat direction S corresponds to the direction of travel F, respectively, and at the same time rotated inward toward the longitudinal center plane 3. During positioning, the seat console 20 is thus displaced, starting from the basic position, forward to the left and forward to the right, respectively, as seen from the view of a vehicle driver, and at the same time rotated to the left and the right, respectively.

Further, at the positioning device 10 a limiting means is provided which is made up of two stops 13. The trajectory of the seat console 20 is limited by the position of the stops 13. In FIG. 3, the seat console 20 is located in the left-hand end position and is displaced to the left relative to the direction of travel F and rotated to the right by 70°. In the left-hand end position the second pivot arm 12 abuts against one of the stops 13. The further movement to the left is thus limited.

In FIG. 4, the seat console 20 is located in the right-hand end position and is displaced to the right relative to the direction of travel F and rotated to the left by 15°. In the right-hand end position the first pivot arm 11 abuts against the other one of the stops 13. The further movement to the right is thus limited.

When the position of the stops 13 is determined, the spatial conditions in a driver's cab 200 of a construction machine, where the seat device 100 is arranged, must be taken into account for avoiding collisions. In to the preferred embodiment of the seat device 100 according to the invention, the stops 13 comprise buffer elements made from an elastic material. Due to the provision of buffer elements of an elastic material at the stops 13 an ungentle abutting of the pivot arms 11, 12 against the stops 13 is avoided. Thereby, the comfort and the safety of the seat device 100 are enhanced.

The seat console 20 further comprises a locking device 30 with the aid of which the position of the seat console 20 on the defined trajectory can be locked. The locking device 30 comprises a plate having a fixing element 31 configured as a projection. The positioning device 10 comprises a recess 14 in which the projection can engage in a form-fit manner for locking the position of the seat console 20. The locking device 30 is operated with the aid of an actuating element 32 configured as a lever which allows for locking and unlocking. The plate of the locking device 30 can be fastened to the seat console 20 via a hinge, wherein between the plate and the seat console 20 a pressure spring can be provided which presses the projection of the plate into the holes and thus creates a form fit. With the aid of the actuating element 32 the plate can be pressed toward the seat console 20, wherein the pressure spring is compressed and the projection of the plate is levered out of the holes. This results in unlocking, and a vehicle driver can position the seat console 20 together with the seat 21 in a desired position.

According to the preferred embodiment of the invention, six recesses 14 are provided in the base plate of the positioning device 10, which recesses, as seen from the view of a vehicle driver sitting on the seat 21 and positioned in the direction of travel, define the following positions of the seat 21 and the seat console 20, respectively:

Displacement of the seat 21 and the seat console 20, respectively, to the left and rotation of the seat 21 and the seat console 20, respectively, by 70° to the right,
displacement of the seat 21 and the seat console 20, respectively, to the left and rotation of the seat 21 and the seat console 20, respectively, by 55° to the right,
displacement of the seat 21 and the seat console 20, respectively, to the left and rotation of the seat 21 and the seat console 20, respectively, by 40° to the right,
displacement of the seat 21 and the seat console 20, respectively, to the left and rotation of the seat 21 and the seat console 20, respectively, by 20° to the right,
basic position,
displacement of the seat 21 and the seat console 20, respectively, to the right and rotation of the seat 21 and the seat console 20, respectively, by 15° to the left.

The seat device 100 according to the preferred embodiment of the invention allows for advantageously positioning a seat console 20 with a seat 21 arranged thereon in a single work step. Positioning is performed along a curved trajectory predefined as dictated by the design, wherein it is ensured that no collisions occur along the trajectory. In particular, a collision of operating elements arranged at the seat 21 with the driver's cab 200 of the vehicle driver can thereby be effectively avoided. The operational safety as well as the operating comfort are thus considerably enhanced in comparison to conventional seat devices.

The invention claimed is:

1. A seat device for a construction machine, comprising a positioning device and a seat console having a seat arranged thereon, wherein
the positioning device comprises a first pivot arm and a second pivot arm for guiding the seat console along a curved trajectory, wherein the pivot arms respectively comprise a first end and a second end, wherein the respective first end of the pivot arms is supported on the positioning device via a respective first rotary joint, wherein the first rotary joints of the pivot arms have a distance $A_1$ and the respective second end of the pivot arms is connected to the seat console via a respective second rotary joint in a manner as spaced apart from each other, wherein the second rotary joints of the pivot arms have a distance $A_2$, wherein the distance of the first rotary joint of the first pivot arm to the second rotary joint of the first pivot arm is $L_{11}$, and the distance of the first rotary joint of the second pivot arm to the second rotary joint of the second pivot arm is $L_{12}$, and wherein $L_{11} \neq L_{12}$, wherein, during positioning, the seat console is moved, starting from a basic position, along the curved trajectory and, in doing so, is rotated inward toward the longitudinal center plane of the positioning device.

2. The seat device according to claim 1, wherein the curved trajectory along which the seat console is adapted to be positioned lies in a plane orthogonal to the longitudinal center plane of the positioning device.

3. The seat device according to claim 1, wherein the first pivot arm and the second pivot arm do not intersect each other when the seat console is positioned along the entire course of the curved trajectory.

4. The seat device according to claim 1, wherein the second rotary joints of the pivot arms are spaced apart at the same distance from the front edge of the seat console, as seen in the seat direction.

5. The seat device according to claim 1, wherein the following applies: $L_{11} > A_2 > 0.1 L_{11}$ and/or $L_{12} > A_2 > 0.1 L_{12}$.

6. The seat device according to claim 1, wherein the second rotary joint of the first pivot arm is always located between a first plane and a second plane when the seat console is moved, wherein the first plane lies in parallel to the longitudinal center plane of the positioning device and extends through the first rotary joint of the first pivot arm, and wherein the second plane lies in parallel to the longitudinal center plane of the positioning device and extends through the first rotary joint of the second pivot arm.

7. The seat device according to claim 1, wherein the following applies: $A_1 > 0.5 L_{11}$ and $A_1 > 0.5 L_{12}$.

8. The seat device according to claim 1, wherein the positioning device comprises a limiting means which limits the trajectory of the seat console.

9. The seat device according to claim 8, wherein the limiting means is made up of at least two stops, wherein the trajectory of the seat console is limited by at least one stop in every direction of movement.

10. The seat device according to claim 9, wherein the at least two stops comprise buffer elements.

11. The seat device according to claim 1, further comprising a locking device with the aid of which the position of the seat console is adapted be locked relative to the positioning device.

12. The seat device according to claim 11, wherein the locking device is arranged at the seat console.

13. The seat device according to claim 12, wherein the positioning device comprises a base plate having at least one recess and the locking device comprises a fixing element, wherein the position of the seat console relative to the positioning device is adapted to be locked by the fixing element engaging in the at least one recess.

14. The seat device according to claim 13, wherein the base plate of the positioning device comprises at least three recesses, wherein a left-hand end position, a right-hand end position and the basic position of the seat console are defined by a respective recess.

15. The seat device according to claim 11, wherein the locking device comprises an actuating element for locking and unlocking purposes.

16. The seat device according to claim 1, wherein the first and/or the second pivot arm have an angled and/or bent shape.

17. A construction machine, in particular an earth-moving machine, comprising a seat device according to claim 1.

18. The seat device according to claim 1, wherein the first rotary joints are offset from each other in the direction of travel.

19. The seat device according to claim 1, wherein $A_2 > A_1$.

20. The seat device according to claim 1, wherein $A_2 > A_1$ and the first rotary joints are offset from each other in the direction of travel.

* * * * *